April 13, 1926.  
J. E. McBRIDE  
1,580,745  
APPARATUS FOR CHARGING AND REMOVING TIRES FROM VULCANIZING MOLDS  
Filed July 14, 1919   3 Sheets-Sheet 1
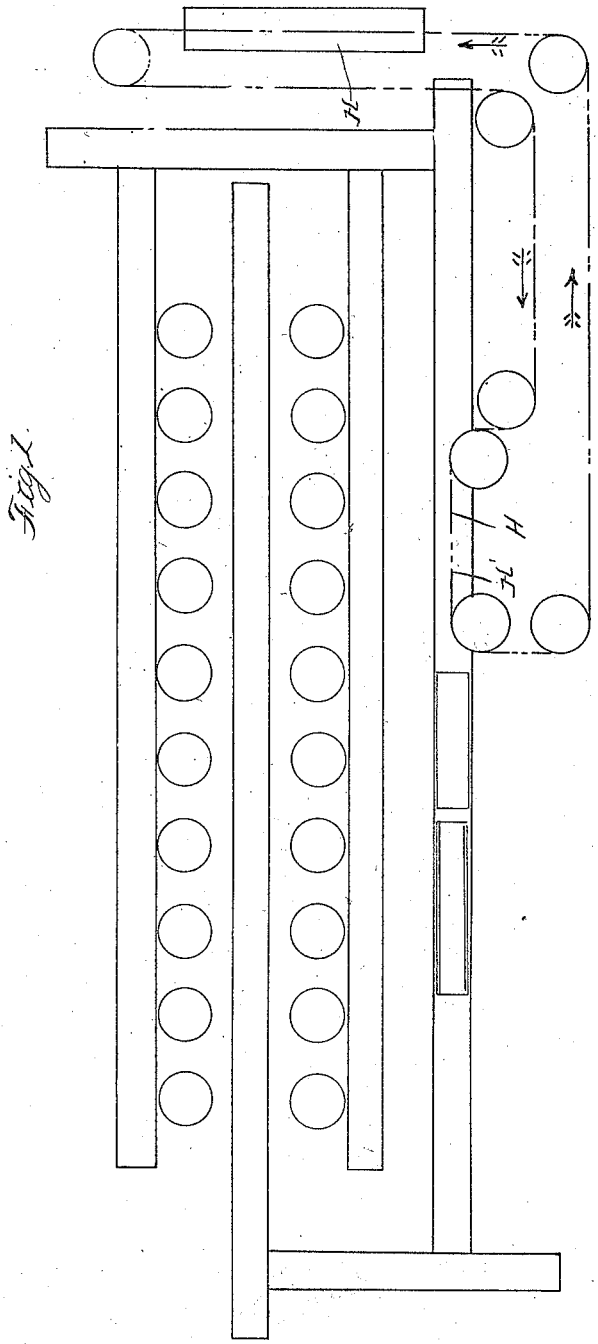
Inventor  
Jesse E. McBride

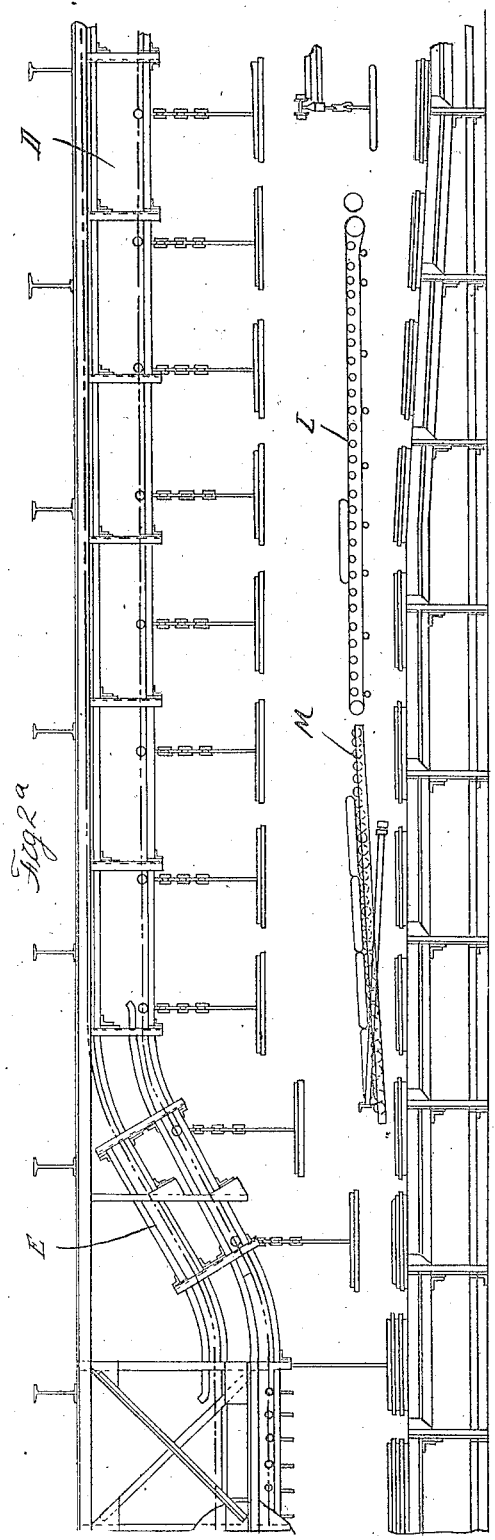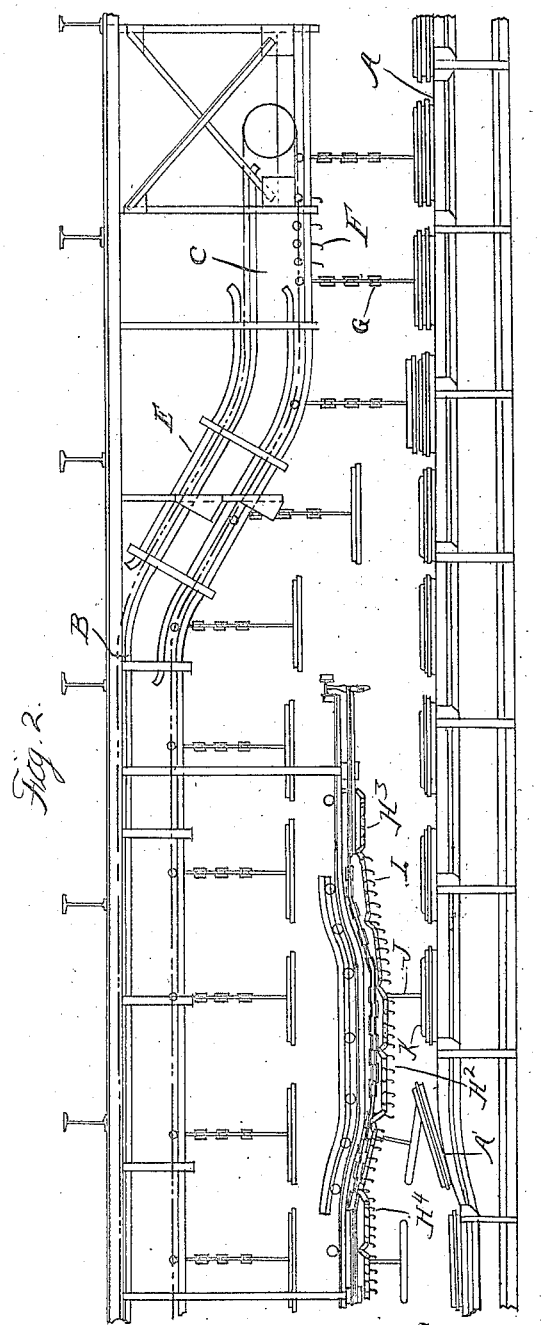

April 13, 1926.  
J. E. McBRIDE  
1,580,745  
APPARATUS FOR CHARGING AND REMOVING TIRES FROM VULCANIZING MOLDS  
Filed July 14, 1919  
3 Sheets-Sheet 3
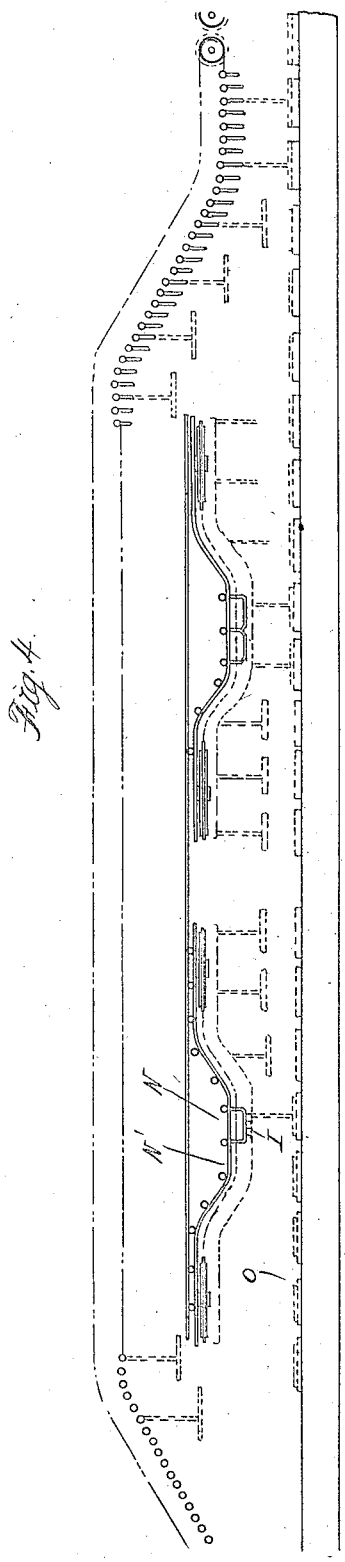
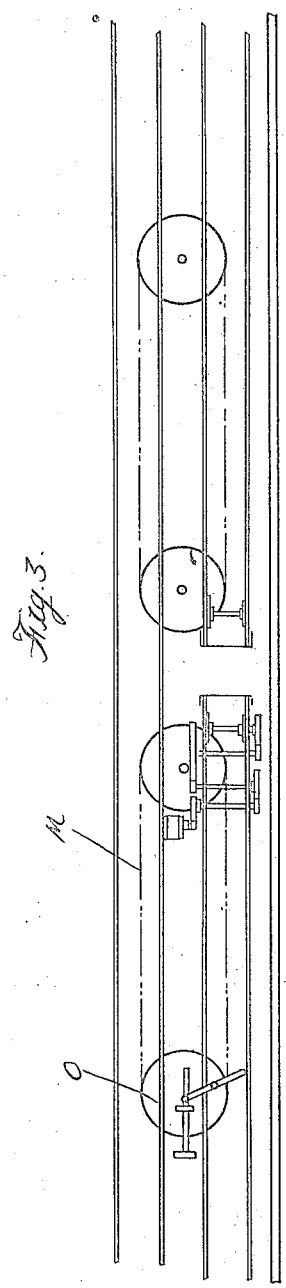
Inventor  
Jesse E. McBride  
By  
Attorneys Patented Apr. 13, 1926.

1,580,745

UNITED STATES PATENT OFFICE.

JESSE E. McBRIDE, OF DETROIT, MICHIGAN, ASSIGNOR TO PALMER-BEE COMPANY, OF DETROIT, MICHIGAN, A CORPORATION OF MICHIGAN.

APPARATUS FOR CHARGING AND REMOVING TIRES FROM VULCANIZING MOLDS.

Application filed July 14, 1919. Serial No. 310,834.

*To all whom it may concern:*

Be it known that I, JESSE E. McBRIDE, a citizen of the United States of America, residing at Detroit, in the county of Wayne and State of Michigan, have invented certain new and useful Improvements in Apparatus for Charging and Removing Tires from Vulcanizing Molds, of which the following is a specification, reference being had therein to the accompanying drawings.

The invention relates to apparatus particularly designed for use in the heat treatment of tires and similar articles, and it is a primary object of the invention to reduce the manual labor in charging and removing the work from the molds. Also to expedite in operation and to economize in space required. Heretofore apparatus has been devised in which the complementary sections of the outer molds for tires are carried on a conveyor or series of conveyors away from and returning to the point of heat treatment. There has also been provided means for separating the complementary sections of said outer molds during transit so as to permit the removal of the cured tires therefrom and the recharging of the molds with green tires. It is, however, necessary to place the green tires upon inner core members before they are inserted in the outer molds, and the weight of these core members added to the weight of the tire cases is such as to require considerable muscular exertion in manually handling the same. Furthermore, where the outer mold sections are separated and reengaged automatically during transit, it is necessary to remove the cores from between the registered sections and during the time in which they are spaced from each other.

With the present invention the labor of lifting the tires and cores both in charging and removing is mechanically performed and there is also provided transporting means registerable with the separated portions of the outer molds during the portion of the orbit where the mechanical lifting is effected. Thus, the operation of stripping the finished tires from the cores and of placing green tires upon said cores may be performed at a convenient point or points from which the work is transported, without manual labor, into engagement with the outer molds.

In the drawings:

Figure 1 is a diagrammatic plan view of a mold conveying apparatus to which my improvement is applied;

Figures 2 and 2ᴬ are elevations of the sections of the conveyor in which the green cores are registered and engaged with the outer molds and the finished work is removed from said molds.

Figures 3 and 4 are views showing a modified form of apparatus for performing one of the steps in the operation.

A is a conveyor for the outer molds which at one point in its orbit is in operative relation to a cooperating conveyor B for lifting and separating the cover sections from the molds and for registering and re-engaging the same after the removal of the finished work and recharging with green tires. The construction of this portion of apparatus forms no part of the present invention, but in general, the conveyor B is arranged in the vertical plane of a portion of the conveyor A and has portions C which are close to said conveyor, a portion D more widely separated therefrom, and intermediate inclined portions E. The conveyor B is further provided with a closely spaced series of hooks or hangers F which may be engaged with tongs or lifting devices G for the cover sections of the molds. The arrangement is such that the tongs are engaged with the cover sections and hooks F, while the conveyor B is in the portions C of its orbit so that when the inclined portion E is reached, the covers will be separated from the lower sections of the mold and will be held thus separated during travel along the section D. They will then be again lowered into registration with the lower mold sections during passage over the inclined portion E and the tongs are then disengaged from the covers and hooks.

As heretofore used, it has been necessary for the workman to manually lift the core and tire both during engagement with and disengagement from the outer mold. With my improved construction, this labor is mechanically performed by apparatus constructed as follows:

As shown in Figures 1 and 2, H is a conveyor having a portion of its orbit arranged intermediate the conveyor A and the portion D of the conveyor B. The conveyor H is provided with a multiplicity of hooks I with any one of which there may be engaged tongs J for engaging the cores K around which the tires are placed. A portion H' of the conveyor H is arranged in the vertical longitudinal plane of the conveyors A and B but this portion instead of extending in a straight line in said vertical plane, is preferably bent or dipped downward so that a portion H² thereof is closer to the lower conveyor than portions H³ and H⁴ on opposite sides thereof. As shown, the lower conveyor also has a dipped portion A' opposite the upwardly inclining portion of the conveyor H between the portions H² and H⁴ thereof. The arrangement is such that the operator can engage the tongs J with the hooks I and with the cores K while traveling through the portion H² of the orbit of the conveyor H and after this engagement, the divergence in direction of the conveyors H and A will cause the lifting of the cores and detachment of the same from the lower mold sections. This will permit of the detached cores being carried by the conveyor H away from the conveyor A and to a point where the tires are stripped from the cores.

For charging the molds with green tires mounted upon cores a similar construction of auxiliary conveyor may be employed but additional means must be provided for bringing the cores into exact registration with the molds. This is necessitated by the irregular arrangement of the molds upon the conveyor A, which is due to the fact that said molds are manually transferred from the heat-treating ovens to said conveyor and are therefore not uniformly spaced thereon. As shown in Figure 2, the cores with the green tires thereon are first transferred to a conveyor L arranged horizontally above the conveyor A and beneath the portion D of the conveyor B. At the end of the conveyor L is an inclined roller chute M. The arrangement is such that the cores will be fed off from the conveyor L onto the inclined roller chute M, from the lower end of which they are fed into engagement with the lower sections of the molds. While on the roller chute M, the travel of the cores may be either accelerated or retarded and in this manner can be brought into exact registration with the molds in which they are to be deposited.

As shown in the modification of Fig. 4, in place of the conveyor L and roller chute M, there is arranged a conveyor N similar to the conveyor H but with means such as friction drive wheels O' for varying the speed thereof. Preferably, the normal speed of this conveyor is the same as the speed of the conveyor A so that where the molds are closely spaced, the cores will be fed into registration therewith. On the other hand, if the molds are further apart, by retarding the speed of the conveyor N after one core has been deposited in its mold, the next core will be brought into registration with the following mold.

In the completing operation of apparatus, the green tires are placed upon cores at a suitable point and are then transported by a conveyor O. Beneath a portion of the conveyor N which has a depressed portion N', the tongs are then engaged with the hooks I and with the cores so that when the work travels up the incline past the depression N', said tongs will lift the cores clear from the conveyor O. The conveyor N will then carry the suspended cores over the conveyor A and by suitably retarding the movement of the conveyor N the core is first brought into registration with a mold and then deposited in said mold by a depression N² in the conveyor. When deposited, the tongs may be disengaged from the core and in the further travel of the conveyors A and B, the cover section of the outer mold will be deposited upon the lower section enclosing the core and tire and the molds are then transferred to the heat-treating ovens and after heat treatment are replaced on the conveyor A and are carried to the point where the covers are lifted from the outer molds and the portion H' of the conveyor H is in registration with the conveyor A. The cores may then be engaged to tongs suspended from the hooks I and in the further progress the cores will be lifted from the molds and conveyed to the point of stripping, as previously described.

What I claim as my invention is:

1. The combination with means for transporting a series of sectional molds and means for separating and reuniting the sections thereof during transit, of means operating between the separated sections of molds and capable of connection with the work for lifting and removing the work from the lower sections thereof, and means also operating between the separated sections of the molds for charging the same with new work in advance of the reuniting of the sections.

2. In combination, a conveyor on which molds are irregularly spaced for transporting the same, means for separating and reuniting the sections of the molds during transit, means operating irrespective of the spacing of said molds and capable of a connecting engagement with the work for removing the work from between the separated sections thereof, and means also operating between the separated sections of the molds for conveying new work therebetween and for registering and depositing the same in the irregularly spaced molds.

3. The combination with a conveyor on which molds are irregularly spaced for transporting the same, of means for separating the sections of the molds and for reuniting the same during transit, a conveyor having a portion of its orbit extending between the separated sections of said molds, and means carried by said last-mentioned conveyor registrable with the molds irrespective of the spacing thereof for engaging the work.

4. In combination, a conveyor on which molds are irregularly spaced for transporting the same, means operating during transit for separating and reuniting the sections of said molds, a conveyor having a portion of its orbit arranged between the separated sections of the molds in the same vertical plane but at varying distances therefrom, and means carried by said last-mentioned conveyor engageable with the work in one section of the mold in the portion of the orbit most closely approaching the same and disengaging the work from the mold in divergent portions of the orbits of the two conveyors.

5. The combination with a conveyor for transporting molds, of means for separating the sections of the molds and reuniting the same during transit, a work conveyor having a portion of its orbit arranged between and in the vertical plane of the separated sections of said molds but at varying distances from the orbit of the first-mentioned conveyor, and means registrable and engageable with the work in said molds in the most closely approaching portions of the orbits of said conveyors operating to disengage the work from the sections of the molds in the divergent portion of said orbits and to remove the same before the reuniting of the molds.

6. The combination with a conveyor for transporting molds, of means operating during transit for separating and reuniting the sections of said molds, a conveyor having a portion of its orbit extending between the separated sections of the molds and approaching and receding from the orbit of the first-mentioned conveyor in the same vertical longitudinal plane, and means registrable with the work in the sections of said molds irrespective of the spacing of the same on the first-mentioned conveyor and at the point where the orbits of said conveyors must closely approach for engaging the work, whereby it will be automatically separated and removed from between the sections of the molds before the reuniting of the same.

7. In combination, of a conveyor on which molds are irregularly spaced for transporting the same; means for separating and reuniting the sections of the molds during transit, a conveyor having a portion of its orbit arranged between the sections of the molds in the vertical longitudinal plane of the first-mentioned conveyor, the orbits of the two conveyors approaching and receding from each other in the said portion thereof, means on the second-mentioned conveyor for engaging the work in the sections of the molds, and means for varying the speed of said second-mentioned conveyor for registering the work-engaging means with the molds at the most closely approaching points of the orbits of the two conveyors.

In testimony whereof I affix my signature.

JESSE E. McBRIDE.